G. C. ENGSTRAND.
FLOATING DRY DOCK.
APPLICATION FILED MAR. 27, 1912.

1,043,411.

Patented Nov. 5, 1912.

2 SHEETS—SHEET 1.

Witnesses:
Frederick W. Quidas
Frank Nichols

Inventor
Gunnar C. Engstrand
By his Attorneys
Blackwood Bros.

G. C. ENGSTRAND.
FLOATING DRY DOCK.
APPLICATION FILED MAR. 27, 1912.

1,043,411.

Patented Nov. 5, 1912.
2 SHEETS—SHEET 2.

Witnesses:
Frederick W. Luidas
Frank Nichols

Inventor
Gunnar C. Engstrand
By his Attorneys
Blackwood Bros.

UNITED STATES PATENT OFFICE.

GUNNAR C. ENGSTRAND, OF TOMPKINSVILLE, NEW YORK.

FLOATING DRY-DOCK.

1,043,411.  Specification of Letters Patent.  Patented Nov. 5, 1912.

Application filed March 27, 1912.  Serial No. 686,542.

*To all whom it may concern:*

Be it known that I, GUNNAR C. ENGSTRAND, a subject of the King of Sweden, residing at Tompkinsville, in the county of Richmond and State of New York, have invented certain new and useful Improvements in Floating Dry-Docks, of which the following is a specification.

My invention relates to floating dry docks. It has for its object to provide a floating dry dock having intermediate chambers open at their bottoms and adapted to contain fluids, viz; air and water, and lateral chambers closed at their bottoms and adapted to contain fluids, viz; air and water and being in communication with the intermediate chambers, whereby the lateral chambers will act to support the dock when it is raised and upon the sinking of the dock water will rise in the intermediate chambers and force air therefrom into the lateral chambers and store it therein and upon the compressor being started the compressed air which has been stored in the lateral chambers is mixed with that from the compressor, thus reducing the amount of compressed air necessary to be furnished by the compressor to raise the dock and consequently reducing the amount of pumping and time required to raise the dock. Also as a consequence of the intermediate chambers of the dock being open at the bottom and allowing water to rise therein as the dock sinks, the strain upon the bottom of the dock is reduced as instead of water bearing against a full bottom surface it bears against a partial bottom surface, viz; the bottoms of the lateral chambers and the reduction of the surface against which the water bears also reduces the length of time required to sink the dock and enables it to be made lighter in weight.

It has for a further object to provide a floating dry dock having wings forming chambers independent of the lateral and intermediate chambers and adapted to contain fluids, viz; air and water and provided with gates, whereby said chambers will act as supporting chambers when the dock is sunk and the dock can be kept level by admitting or exhausting water from the wings.

It has for a still further object to provide a floating dry dock having air chambers spaced apart and extending along the sides thereof, whereby the maximum stability is given to the dock when raised.

Figure 1:
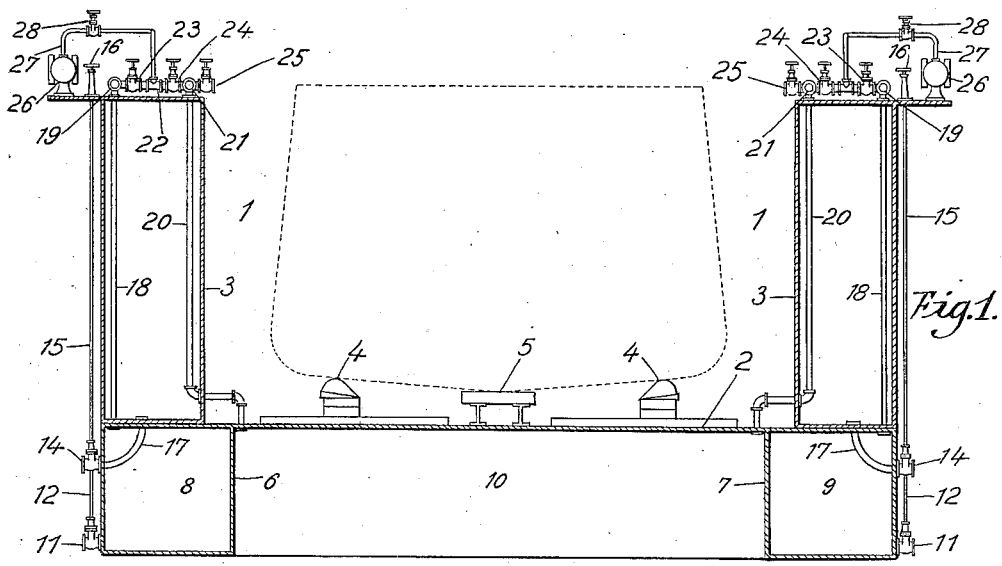
Figure 2:
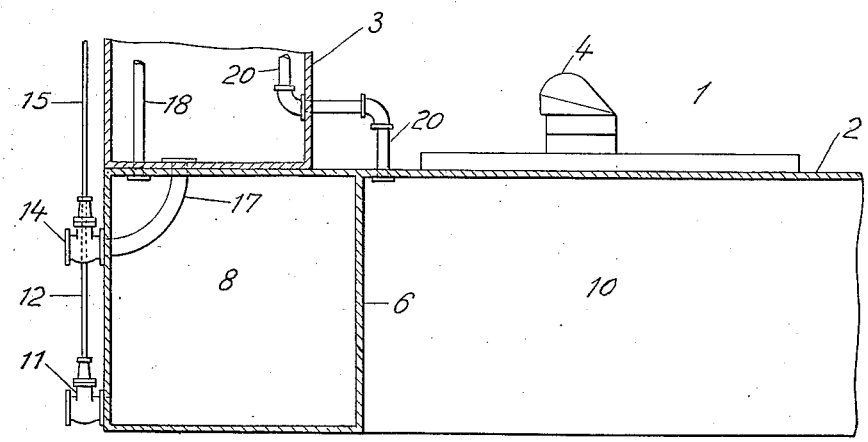
Figure 3:
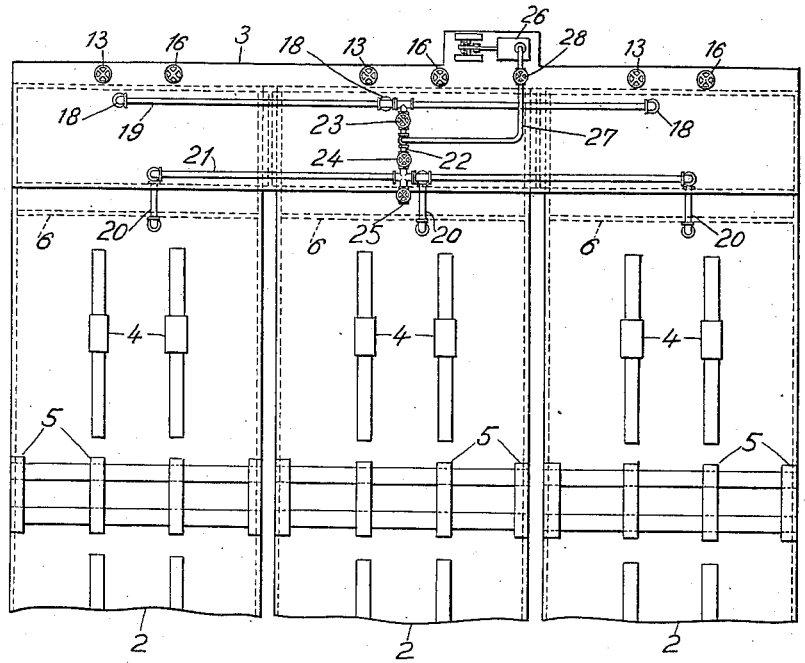
Figure 4:
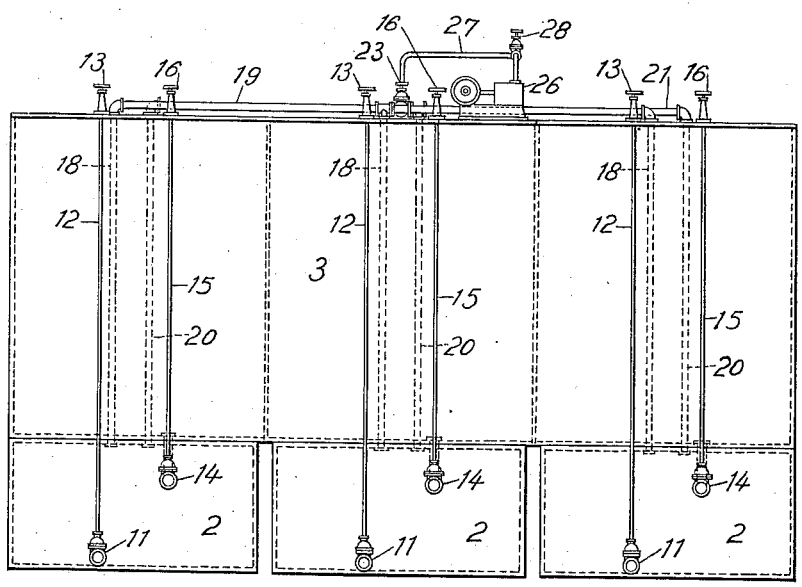

In the drawings: Figure 1 is a transverse sectional view of the dock, a vessel being shown thereon in dotted lines. Fig. 2, a fragmentary transverse sectional view, on an enlarged scale, of the dock. Fig. 3, a fragmentary plan view of the dock. Fig. 4, a side view of the dock.

Referring to the drawings illustrating my invention, in which like reference characters designate corresponding parts, 1 designates the floating dry dock which, as shown in the accompanying drawings, comprises a plurality of hollow pontoons 2 connected at their ends by hollow sides or wings 3 secured upon their decks in any suitable manner. Bilge blocks 4 and keel blocks 5 are provided upon the decks of the pontoons for supporting a vessel thereon. Each pontoon is divided internally by transverse bulkheads 6 and 7 into lateral chambers 8 and 9 closed at the bottom and adapted to contain fluids, viz; air and water and an intermediate chamber 10 permanently open at the bottom and adapted to contain fluids, viz; air and water, the water being admitted and exhausted through the bottom. The end walls of the pontoons are provided with combined inlet and outlet openings opened and closed by gates 11 and raised and lowered by rods 12, the lower ends of which are secured to the gates and the upper ends being threaded and having hand wheels 13 thereon for operating them, these combined inlets and outlets serving to allow water to be admitted into the lateral chambers in sufficient quantity to primarily sink the dock to a slight degree. The end walls of the pontoons are also provided with combined inlet and outlet openings opened and closed by gates 14, raised and lowered by rods 15, the lower ends of which are secured to the gates and the upper ends being threaded and having hand wheels 16 thereon for operating them, these combined inlets and outlets being connected by pipes 17 with openings in the bottoms of the wings and serving to allow water to be admitted into the chambers thereof to sink the dock and to allow water to be exhausted therefrom when the dock is rising.

On each side of the dock the lateral chambers are connected in communication with each other by pipes 18 connected at their lower ends with holes in the tops of said chambers and at their upper ends with a pipe 19 extending along the top of the wing. The intermediate chambers are connected in communication with each other by pipes 20 connected at their lower ends with holes in the tops of said chambers and at their upper ends with a pipe 21 extending along the top of the wing. The lateral chambers are connected in communication with the intermediate chambers by a pipe 22 one end of which is connected with the pipe 19 and the other end with the pipe 21. Communication between the lateral and intermediate chambers is established or interrupted by means of valves 23 and 24 and communication between said chambers and the exterior is established or interrupted by means of a pipe joint having a valve 25. A compressor 26 is mounted on a lateral extension of the wing and communication between the compressor and the lateral and intermediate chambers is established or interrupted by means of a pipe 27 having a valve 28, one end of said pipe being connected to the compressor and the other end to the pipe 22.

It being assumed that the keel and bilge blocks are in the proper position, the operation of primarily sinking and raising the dock is as follows: The valves 23, 24 and 25 are opened whereupon the dock will sink to a degree at which its deck will be just above the surface of the water floating said dock, and water will rise in the intermediate chambers to a degree at which its surface will correspond in height to the water floating said dock, this being due to the buoyancy of the lateral chambers being greater than the weight of the deck. The gates 11 are then opened and retained open until water has entered the lateral chambers in sufficient quantity to sink the dock so that it will be supported afloat by the buoyancy of the wings and the gates 11 are then closed. The gates 14 are then opened and retained open until water has entered the wings in sufficient quantity to sink the dock to the depth required to adapt it to receive a ship. The gates 14 and valve 25 are then closed. A ship is now placed in the dock and the compressor is started causing air to be forced into and stored in the lateral chambers and also causing air to be forced into the intermediate chambers and force the water therefrom, whereupon the dock will rise. The gates 14 are then opened and the water is allowed to flow from the wings and when the dock has risen sufficiently to bring the hull of the ship out of water the compressor is stopped and the valves 23 and 24 and gates 14 closed.

The operations and results of sinking and raising the dock subsequent to the primary operation, above described, are the same as the primary operation except that in the subsequent operations, the air which was stored up in the lateral chambers, due to the sinking of the dock with weight of ship thereon, will mix with the air from the compressor and pass into the intermediate chambers, thus reducing the pumping required to raise the dock.

The lateral chambers are adapted to be disconnected from the intermediate chambers so that the air stored in the lateral chambers is not used when the dock is raised without a ship thereon.

I do not wish to be understood as limiting myself to the details of construction and arrangement as herein described and illustrated, as it is manifest that variations and modifications may be made in the features of construction and arrangement in the adaptation of the device to various conditions of use without departing from the spirit and scope of my invention and improvements. I therefore reserve the right to all such variations and modifications as properly fall within the scope of my invention and the terms of the following claims.

I claim:

1. In a floating dry dock, wings, a body, on which said wings are mounted, having fluid chambers provided with closed bottoms and supporting the dock when raised and fluid chambers provided with permanently open bottoms allowing the free passage of water into and from said chambers and means adapting air to be supplied to the open bottom chambers, to force water therefrom, to the supporting chambers in the body and adapting air to pass back and forth between the open bottom chambers and the supporting chambers in the body, substantially as described.

2. In a floating dry dock, wings, a body, on which said wings are mounted, having lateral fluid chambers provided with closed bottoms and supporting the dock when raised and intermediate fluid chambers provided with permanently open bottoms allowing the free passage of water into and from said chambers and means adapting air to be supplied to the open bottom chambers, to force water therefrom, to the supporting chamber in the body and adapting air to pass back and forth between the open bottom chambers and the supporting chambers in the body, substantially as described.

3. In a floating dry dock, wings, pontoons, on which said wings are mounted, each pontoon having fluid chambers provided with closed bottoms and supporting the dock when raised and a fluid chamber provided with a permanently open bottom allowing the free passage of water into and from said chamber and means adapting air to be supplied to the open bottom chambers, to force water therefrom, to the supporting chambers in the pontoons and adapting air to pass back and forth between the open bottom chambers and the supporting chambers in the pontoons, substantially as described.

4. In a floating dry dock, wings, pontoons, on which said wings are mounted, each pontoon having lateral fluid chambers provided with closed bottoms and supporting the dock when raised and an intermediate fluid chamber provided with a permanently open bottom allowing the free passage of water into and from said chamber and means adapting air to be supplied to the open bottom chambers, to force water therefrom, to the supporting chambers in the pontoons and adapting air to pass back and forth between the open bottom chambers and the supporting chambers in the pontoons, substantially as described.

5. In a floating dry dock, wings having fluid chambers supporting the dock when sunk and receiving water to sink the dock, a body, on which said wings are mounted, having fluid chambers provided with closed bottoms and supporting the dock when raised and fluid chambers provided with permanently open bottoms allowing the free passage of water into and from said chambers and means adapting air to be supplied to the open bottom chambers, to force water therefrom, to the supporting chambers in the body and adapting air to pass back and forth between the open bottom chambers and the supporting chambers in the body, substantially as described.

6. In a floating dry dock, wings having fluid chambers supporting the dock when sunk and receiving water to sink the dock, a body, on which said wings are mounted, having lateral fluid chambers provided with closed bottoms and supporting the dock when raised and intermediate fluid chambers provided with permanently open bottoms allowing the free passage of water into and from said chambers and means adapting air to be supplied to the open bottom chambers, to force water therefrom, to the supporting chambers in the body and adapting air to pass back and forth between the open bottom chambers and the supporting chambers in the body, substantially as described.

7. In a floating dry dock, wings having fluid chambers supporting the dock when sunk and receiving water to sink the dock, pontoons, on which said wings are mounted, each pontoon having fluid chambers provided with closed bottoms and supporting the dock when raised and a fluid chamber provided with a permanently open bottom allowing the free passage of water into and from said chamber and means adapting air to be supplied to the open bottom chambers, to force water therefrom, to the supporting chambers in the pontoons and adapting air to pass back and forth between the open bottom chambers and the supporting chambers in the pontoons, substantially as described.

8. In a floating dry dock, wings having fluid chambers supporting the dock when sunk and receiving water to sink the dock, pontoons, on which said wings are mounted, each pontoon having lateral fluid chambers provided with closed bottoms and supporting the dock when raised and an intermediate fluid chamber provided with a permanently open bottom allowing the free passage of water into and from said chamber and means adapting air to be supplied to the open bottom chambers, to force water therefrom, to the supporting chambers in the pontoons and adapting air to pass back and forth between the open bottom chambers and the supporting chambers in the pontoons, substantially as described.

In testimony whereof I have signed my name in the presence of two subscribing witnesses.

GUNNAR C. ENGSTRAND.

Witnesses:
FREDERICK W. QUIDAS,
FRANK NICHOLS.

---

Copies of this patent may be obtained for five cents each, by addressing the "Commissioner of Patents, Washington, D. C."